United States Patent Office 3,328,469
Patented June 27, 1967

3,328,469
HYDRATION OF PROPYLENE TO ISOPROPANOL USING CUPRIC-CUPROUS HALIDE CATALYST AND INORGANIC HALIDE SOLUBILIZER
Marshall L. Spector, Livingston, and John H. Craddock, Princeton, N.J., and Frank E. Caropreso, Staten Island, N.Y., assignors to Pullman Incorporated, Chicago, Ill., a corporation of Delaware
No Drawing. Filed May 7, 1964, Ser. No. 365,807
16 Claims. (Cl. 260—641)

The invention relates in one aspect to an improved process for the hydration of an olefin to its corresponding alcohol, and more specifically to the direct hydration of a hydrocarbon olefin to a secondary or tertiary alcohol. In one aspect the invention relates to the direct hydration of propylene to isopropyl alcohol.

The hydration of light olefins is carried out commercially on a large scale. In most cases, the alcohol is produced in a two-stage esterification-hydrolysis process using sulfuric or phosphoric acid as catalysts.

In a few other cases the alcohol is produced in a direct vapor phase hydration process passing olefin and steam through a fixed bed of catalyst, e.g., phosphoric acid supported on a suitable medium.

Although both types of processes are used commercially, they both possess some disadvantages. In the case of the liquid two-stage esterification-hydrolysis process, the reconcentration of the dilute spent acid is very costly, and the losses of acid are considerable.

In the case of the fixed bed one-step solid catalyst process, one disadvantage is the large reaction vessel necessary to achieve contact times that will result in a reasonable conversion. Another disadvantage inherent to a static solid catalyst system is the difficulty of temperature control throughout the catalyst bed. Still another disadvanage is the difficulty of maintaining catalyst activity due to migration and depletion of the phosphoric acid which necessitates periodic shutdowns of the reactor for regeneration of the catalyst.

It is, therefore, an object of the present invention to overcome the above difficulties by providing an economical and commercially feasible process for producing alcohol.

Another object of the present invention is to minimize catalyst losses normally encountered in the hydration reaction.

Another object of the present invention is to provide a process employing a catalyst system which can be readily regenerated and reused without necessitating shutdowns of the reactor.

Another object is to provide a commercially feasible process for the direct hydration of an olefin to produce the corresponding alcohol.

Another object of the invention is to provide a process for the production of isopropyl alcohol which can be performed in a single reaction step.

Another object of the invention is to provide a process for the production of isopropyl alcohol wherein an improved contact between the feed and catalyst is realized.

Another object of the invention for the hydration of propylene is to provide a process wherein good temperature control is maintained in the reaction zone.

Another object of the invention is to provide a process for the production of isopropyl alcohol in high selectivity.

Still another object of the invention is to provide a process for the production of isopropyl alchol at high conversion.

Still another object of the invention is to provide for the production of isopropyl alcohol with minimal formation of by-products which cannot be recycled to extinction.

Yet another object of the invention is to provide a process for the production of isopropyl alcohol containing about one percent of water.

Another object of the invention is to provide a process for the production of isopropyl alcohol substantially free of impurities.

These and other objects of the invention will become apparent to those skilled in the art from the accompanying description and disclosure.

According to the present invention isopropyl alcohol is produced in a single-stage hydration at a temperature between about 140° C. and about 190° C. by catalytic contact of propylene, with an aqueous cupric-cuprous halide catalyst system wherein the total copper concentration is maintained between about 0.5 and about 6 molar and the ratio of copper in the cupric form to copper in the cuprous form is between about 0.2:1 and about 10:1. The catalyst system comprises, as the active portion, a mixture of cupric and cuprous halide, and where necessary to maintain the catalyst system in a homogeneous fluid state, a solubilizing portion selected from the group consisting of a halide of lithium, sodium, rubidium, cesium, potassium, beryllium, magnesium, calcium, strontium, barium and ammonium and mixtures thereof.

The halide catalysts and solubilizers of the present system are selected from the group consisting of chlorides and bromides. However, the chloride is the preferred halide to effect the catalytic hydration of propylene to isopropyl alcohol.

In the case where the hydration of propylene is carried out employing a catalyst system consisting solely of copper halides in aqueous solution, the total copper concentration can vary from about 0.5 molar to 6 molar, the preferred range being from about 1 molar to 5 molar in total copper salts. The ratio of the copper in the cupric form to the copper in the cuprous form can vary from about 1.5:1 to about 10:1, the preferred range being from about 2:1 to about 5:1. The hydration of propylene using the catalyst system without solubilizer is carried out at a temperature between about 140° C. to about 175° C., the preferred range being from 145° C. to about 160° C.

In the case where the hydration of propylene is carried out employing a catalyst system consisting of cupric halide-cuprous halide and one or more inorganic solubilizing agents, the total copper concentration can vary over a range from about 0.5 molar to about 5 molar, the preferred range being from about 1 molar to 4 molar. The ratio of the copper in cupric form to the copper in cuprous form can vary over a range from about 0.2:1 to about 10:1 the preferred range being from about 0.4:1 to about 3:1.

The concentration of the solubilizing halide, calculated as the equivalent ratio of solubilizing halide to cuprous halide is between about 4:1 and about 0.5:1, the preferred range being between about 2:1 and about 1:1. The hydration of propylene to isopropyl alcohol using the above mentioned catalyst system with a solubilizing agent is carried out at a temperature from about 140° C. to about 190° C., the preferred range being from about 150° C. to about 180° C.

The reaction pressure should be sufficient to maintain the catalyst in a liquid state; a pressure up to about 1000 pounds per square inch can be employed, pressures within the range from about 50 pounds per square inch to about 500 pounds per square inch have been found to be effective.

An advantage of the present invention is that intimate contact is achieved between the propylene feed and the catalyst system by reason of its liquid state, and consequently it is possible to design a reactor of much smaller dimensions than in the case where a solid catalyst system is employed.

Another advantage of the present system is that high conversions of propylene per pass are obtainable at relatively low partial pressures. This is due to the presence of an aqueous phase which shifts the following equilibrium to the right:

$$C_3H_6 + H_2O \rightleftharpoons CH_3CHOHCH_3$$

Another advantage of the present hydration is that superior temperature control is achieved when employing the aqueous catalyst system of this invention for the reason that any temperature change due to the reaction is quickly dissipated throughout the liquid phase, thus it is possible to operate under isothermal conditions.

The preferred limits for the production of isopropyl alcohol, which are herein set forth, provide a process minimizing the production of by-products, which otherwise would only be removed by costly separation techniques, thus rendering the process less attractive from a commercial and economical standpoint. When operations are carried out within the limits of this inveniton, the products of this process are isopropyl alcohol, isopropyl halide and 1,2-dihalopropane.

It has been shown that the reaction for producing isopropyl halide is reversible, employing the ranges of operating conditions specified in this disclosure. The yield of isopropyl alcohol can therefore be appreciably increased by recycling the isopropyl halide to extinction.

The reaction in which 1,2-dihalopropane is formed is irreversible at the conditions specified herein. The elimination of this product, therefore, cannot be achieved by its being fed back to the reactor zone. However, by operating under the preferred conditions, it is possible to reduce the formation of said by-product to trace quantities, such that no special step to remove this by-product from the product stream is necessary, except by purging the recycle stream to prevent excessive buildup of this by-product in the system.

As some halogenated products are always formed during the reaction, the catalyst will be depleted of halogen and the cupric portion of the cupric-cuprous halide mixture will decrease as cupric halide attains a lower valence state by giving up a halogen atom to the olefin. In addition, the molarity of the catalyst solution will change as the reaction progresses, due to vaporization loss and to the removal of one molecule of water for each molecule of alcohol formed. Regeneration of the catalyst system is therefore recommended, and this can be accomplished either by continuously withdrawing the catalyst solution, performing the regeneration in another vessel and subsequently returning the regenerated catalyst to the reactor: or the regeneration can be carried out in situ without interupting the reaction. The spent catalyst solution is treated in either case with hydrogen halide, water or steam, and oxygen or air in amounts sufficient to bring the catalyst solution to its regenerated state.

The members of the process equipment which will retain or be contacted with the aqueous halide catalyst should be composed of, or lined with, acid-resistant materials in order that the catalytic solution will not cause corrosion problems in the system. For example, glass or ceramic lined equipment is suggested as being both inexpensive and readily available for this type of reaction. Graphite, Teflon and tantalum can also be used as lining material for the equipment.

The product from the reaction step is further refined, and the steps necessary to accomplish such refinement depend upon the desired water content in the end product, i.e., whether an azeotropic isopropyl alcohol-water mixture or an essentially anhydrous mixture is desired.

In the case of the manufacture of the isopropyl alcohol azeotrope the products from the reactor are scrubbed with water, preferably in a packed tower. The unconverted propylene and isopropyl halide vapors are recycled back to the reaction zone while the aqueous isopropyl alcohol solution is withdrawn from the bottom of the scrubber and is fed to a distillation zone. In the distillation zone, water is separated as a bottom fraction and is recycled to the scrubber. The overhead, comprising the azeotropic mixture of isopropyl alcohol, can then be sent to a second distillation zone to be freed from impurities such as propylene and isopropyl halide, which are either entrained or dissolved in the water in small amounts.

In the case of the manufacture of "anhydrous" isopropyl alcohol, i.e., containing not more than about 0.15 wt. percent water, the effluent from the reactor is liquedfied by submitting the effluent stream to indirect cooling. Two separate liquid phases will result; the lower phase containing water and some isopropyl alcohol is returned to the reactor and the upper phase containing unconverted propylene, isopropyl alcohol and halogenated by-products, is fed to a distillation zone where light boiling azeotropic mixtures of the by-products are collected overhead with the propylene and fed back to the reactor, while "anhydrous" isopropyl alcohol is collected at the bottom of the distillation zone. If necessary, the liquid recycle stream is purged to prevent excessive buildup of impurities in the system.

For a better understanding of the present invention, reference is now had to the following examples, which are not to be construed as in any way limiting to the scope of the invention.

*Examples 1 through 2*

Examples 1 and 2 demonstrate the criticality of including both cuprous halide and cupric halide in the hydration catalyst system to achieve conversion.

In Example 1, 5.3 moles/hour of propylene was fed into a glass-lined metal reactor containing one liter of an aqueous catalyst solution containing 6.0 moles of cuprous chloride and 8 moles of ammonium chloride as a solubilizer, and the reaction was allowed to take place over a period of 60 minutes, at a temperature of 165° C. and at a total pressure of 200 p.s.i.g. No activity was observed in this experiment.

In Example 2, 10.0 moles/hour of propylene was fed into a glass-lined metal reactor containing one liter of an aqueous catalyst solution containing 4.1 moles of cupric chloride for a period of 90 minutes at a temperature of 165° C. and a total pressure of 180 p.s.i.g. The initial activity was negligible and the initial selectivity to isopropyl alcohol was zero.

Table I summarizes pertinent data of these experiments.

*Examples 3 through 8*

Examples 3 through 8, where catalyst solutions without solubilizers have been employed, demonstrate the effects on product conversion and selectivity of varying the following parameters: total copper concentration, ratio of cupric halide to cuprous halide, feed flow rate and temperature. In each of the examples, propylene was fed into a glass-lined metal reactor containing one liter of catalyst solution at a temperature of 155° C. and a pressure of about 200 p.s.i.g. The duration of each of the experiments was 60 minutes except in the case of Example 3, where the run was carried out for 150 minutes. The total concentrations of copper salts in moles per liter, the cupric to cuprous ratios, the feed rates and the temperatures are all reported in Table II together with the results from the experiments. In all cases the selectivity to the undesirable by-product 1,2-dichloropropane was less than 3 mole percent, except in the case of Example 4, wherein a 6 mole percent selectivity to this product was obtained. This was due to operating in the upper broad range of the cupric to cuprous ratio.

TABLE I.—HYDRATION OF PROPYLENE TO ISOPROPYL ALCOHOL

| Example No | 1 | 2 |
|---|---|---|
| Catalyst Composition: | | |
| CuCl$_2$, M | | 4.1 |
| CuCl, M | 6.0 | |
| NH$_4$Cl solubilizer, M | 8.0 | |
| Propylene Flow, moles/l./hour | 5.3 | 10 |
| Temperature, °C | 165 | 165 |
| Pressure, p.s.i.g | 200 | 180 |
| Initial Conversion, mole percent | 0 | 0 |

TABLE II.—HYDRATION OF PROPYLENE TO ISOPROPYL ALCOHOL

| Example No | 3 | 4 | 5 | 6 | 7 | 8 |
|---|---|---|---|---|---|---|
| Catalyst Composition: | | | | | | |
| CuCl$_2$, M | 2.05 | 4.5 | 4.1 | 4.1 | 3.5 | 4.1 |
| CuCl, M | 0.5 | 0.5 | 1.0 | 1.0 | 1.5 | 1.0 |
| Propylene Flow, moles/l./hour | 6.7 | 9.1 | 6.1 | 9.1 | 8.8 | 9.1 |
| Temperature, °C | 155 | 155 | 155 | 155 | 155 | 165 |
| Pressure, p.s.i.g | 235 | 207 | 217 | 207 | 207 | 207 |
| Total Conversion, mole percent | 6.3 | 18.0 | 14.1 | 7.7 | 13.3 | 4.7 |
| Selectivity, mole percent: | | | | | | |
| Isopropyl alcohol | 75 | 57 | 74 | 69 | 67 | 80 |
| Isopropyl chloride | 25 | 37 | 24 | 29 | 31 | 17 |
| 1,2-dichloropropane | <2 | ~6 | <2 | 2.6 | 1.6 | ~3 |

*Examples 9 through 14*

In Examples 9 through 14, aqueous catalyst solutions are employed, containing solubilizing chlorides in addition to the cupric-cuprous chlorides. Each of the experiments is carried out by feeding approximately 9–10 moles of propylene an hour into a glass-lined metal reactor containing one liter of catalyst solution for a duration of one hour at a pressure slightly above 200 p.s.i.g. The temperatures and the catalyst compositions are varied from experiment to experiment, and the effects of these variables on the product conversion and selectivity are reported in Table III. The selectivities to 1,2-dichloropropane never exceed 3 mole percent; by operating within the preferred ranges, as demonstrated by Example 10, the formation of this undesirable product can be controlled at 0.6 mole percent and less.

*Example 15*

Example 15 demonstrates the use of an aqueous catalyst system containing cupric and cuprous bromides. The experiment was carried out by feeding 10 moles of propylene per hour into a glass-lined metal reactor containing one liter of catalyst solution at a pressure of 210 p.s.i.g. and a temperature of 145° C. The results of the experiment are reported in Table IV.

TABLE III.—HYDRATION OF PROPYLENE TO ISOPROPYL ALCOHOL

| Example No | 9 | 10 | 11 | 12 | 13 | 14 |
|---|---|---|---|---|---|---|
| Catalyst Composition: | | | | | | |
| CuCl$_2$, M | 2.5 | 1.5 | 0.5 | 1.5 | 1.5 | 1.5 |
| CuCl, M | 2.5 | 1.5 | 2.5 | 1.5 | 1.5 | 1.5 |
| NH$_4$Cl, M | 5.0 | 2.0 | 4.0 | 2.0 | | |
| LiCl, M | | | | | 2.0 | |
| CaCl$_2$, M | | | | | | 1.0 |
| Propylene Flow, moles/l./hour | 9.1 | 8.8 | 9.3 | 10.1 | 8.0 | 10.5 |
| Temperature, °C | 155 | 165 | 165 | 185 | 165 | 165 |
| Pressure, p.s.i.g | 206 | 206 | 207 | 205 | 206 | 207 |
| Total Conversion, mole percent | 11.6 | 9.3 | <1 | 8.7 | 10.3 | 7.8 |
| Selectivity, mole percent: | | | | | | |
| Isopropyl alcohol | 59 | 85.2 | 85 | 74.9 | 84 | 86 |
| Isopropyl chloride | 38 | 14.2 | 15 | 20.7 | 15 | 13 |
| 1,2-dichloropropane | 3 | 0.6 | (¹) | 2.1 | <1 | <1 |

¹ Trace.

TABLE IV.—HYDRATION OF PROPYLENE TO ISOPROPYL ALCOHOL

| Example No. | 15 |
|---|---|
| Catalyst composition: | |
| CuBr$_2$, M | 4.1 |
| CuBr, M | 1.0 |
| Propylene flow, moles/l./hour | 10 |
| Temperature, °C. | 145 |
| Pressure, p.s.i.g. | 210 |
| Total conversion, mole percent | 5 |
| Selectivity, mole percent: | |
| Isopropyl alcohol | 26 |
| Isopropyl bromide | 33 |
| 1,2-dibromopropane | 33 |

It is to be understood that any of the solubilizing agents not illustrated in the above examples in combination with the cupric-cuprous chloride mixtures, can be substituted in any of the above examples where solubilizing agents are used to provide a substantial yield of isopropyl alcohol. Thus, in Examples 9–14, the same composition of cupric-cuprous chloride can be employed with the substituted solubilizing agents. Therefore, rubidium chloride, cesium chloride, potassium chloride, strontium chloride, barium chloride or mixtures of the solubilizing agents can be substituted for ammonium chloride, lithium chloride or calcium chloride in the above examples. Such substitution, under the conditions recited in Table III, would provide substantially the same selectivities and yields as those reported in Table III.

Having thus described the process we claim:

1. A process for hydrating propylene to isopropyl alcohol which comprises: contacting said propylene with an queous solution containing a copper halide mixture of cupric and cuprous halide, selected from the group consisting of a chloride and a bromide, wherein the total copper concentration is between about 0.5 molar and about 6 molar, and the ratio of the copper in the cupric form to the copper in the cuprous form is between about 0.2:1 and about 10:1 and the hydration is carried out at a temperature between about 140° C. and about 190° C., under pressure sufficient to at least maintain the aqueous solution in a liquid phase.

2. A process for hydrating propylene to isopropyl alcohol which comprises: contacting said propylene with an aqueous solution containing a copper halide mixture of cupric and cuprous halide, selected from the group consisting of a chloride and a bromide, wherein the total copper concentration is between about 0.5 molar and about 6 molar, and the ratio of the copper in the cupric form to the copper in the cuprous form is between about 1.5:1 and about 10:1 and the hydration is carried out at a temperature between about 140° C. and about 175° C,. under presure sufficient to at least maintain the aqueous solution in a liquid phase.

3. A process for hydrating propylene to isopropyl alcohol which comprises: contacting said propylene with an aqueous solution containing a copper halide mixture of cupric and cuprous halide, selected from the group consisting of a chloride and a bromide, wherein the total copper concentration is between about 1 molar and about 5 molar, and the ratio of the copper in the cupric form is between about 2:1 and about 5:1 and the hydration is carried out at a temperature between about 145° C. and about 160° C., under pressure sufficient to at least maintain the aqueous solution in a liquid phase.

4. A process for hydrating propylene to isopropyl alcohol which comprises: contacting said propylene with an aqueous solution containing a copper chloride mixture of cupric and cuprous chloride, wherein the total copper concentration is between about 1 molar and about 5 molar, and the ratio of the copper in the cupric form is between about 2:1 and about 5:1 and the hydration is carried out at a temperature between about 145° C. and about 160° C., under pressure sufficient to at least maintain the aqueous solution in a liquid phase.

5. A process for the hydration of propylene which comprises: contacting said propylene with an aqueous solution containing a copper halide mixture of cupric halide and cuprous halide selected from the group consisting of a chloride and a bromide and a halide selected from the group consisting of chlorides and bromides of lithium, sodium, patassium, rubidium, cesium, beryllium, magnesium, calcium, strontium, barium, ammonium and mixtures thereof wherein the concentration of total copper is between about 0.5 molar and about 5 molar, the ratio of the copper in the cupric form to the copper in the cuprous form is between about 0.2:1 and about 10:1 and the equivalent ratio of the solubilizing halide to cuprous halide is between about 0.5:1 and about 2:1, and the hydration is carried out at a temperature between about 150° C. and about 190° C., under pressure sufficient to at least maintain the aqueous solution in a liquid phase.

6. A process for the hydration of propylene which comprises: contacting said propylene with an aqueous solution containing a copper halide mixture of cupric halide and cuprous halide selected from the group consisting of a chloride and a bromide and a halide selected from the group consisting of chlorides and bromides of lithium, sodium, potassium, rubidium, cesium, beryllium, magnesium, calcium, strontium, barium, ammonium and mixtures thereof wherein the concentration of total copper is between about 1 molar and about 5 molar and the ratio of the copper in the cupric form to the copper in the cuprous form is between about 0.4:1 and about 3:1 and the equivalent ratio of the solubilizing halide to cuprous halide is between about 1:1 and about 2:1, and the hydration is carried out at a temperature between about 155° C. and about 180° C., under pressure sufficient to at least maintain the aqueous solution in a liquid phase.

7. In the process of claim 6 wherein the catalyst composition comprises an aqueous solution of cupric halide-cuprous halide-ammonium halide.

8. In the process of claim 6 wherein the catalyst composition comprises an aqueous solution of cupric halide-cuprous halide-lithium halide.

9. In the process of claim 6 wherein the catalyst composition comprises an aqueous solution of cupric halide-cuprous halide-calcium halide.

10. In the process of claim 7 wherein the catalyst composition comprises an aqueous solution of cupric chloride-cuprous chloride-ammonium chloride.

11. In the process of claim 8 wherein the catalyst composition comprises an aqueous solution of cupric chloride-cuprous chloride-lithium chloride.

12. In the process of claim 9 wherein the catalyst composition comprises an aqueous solution of cupric chloride-cuprous chloride-potassium chloride.

13. A process for production of an azeotropic mixture of isopropyl alcohol and water comprising: contacting in a reaction zone propylene with an aqueous solution containing a copper halide mixture of cupric and cuprous halide, selected from the group consisting of a chloride and a bromide, wherein the concentration of total copper is between about 0.5 molar and about 6 molar, the ratio of the copper in the cupric form to the copper in the cuprous form is between about 1.5:1 and about 10:1, and the reaction is carried out at a temperature between about 140° C., and about 175° C. under pressure sufficient to at least maintain the aqueous solution in a liquid phase; withdrawing a gaseous effluent comprising reaction products and unconverted feed material from the reaction zone; scrubbing said gaseous effluent with water to sorb isopropyl alcohol in the water; returning the resulting gaseous material from said scrubbing step to the reaction zone; distilling the aqueous solution containing isopropyl alcohol to separate water as a bottoms fraction from an overhead azeotropic alcohol-water mixture; recovering the overhead as the product of the process and returning the aqueous bottoms fraction to the scrubbing zone.

14. A process for the production of an azeotropic mixture of isopropyl alcohol and water comprising: contacting in a reaction zone propylene with an aqueous solution containing a mixture of cupric chloride and cuprous chloride wherein the concentration of total copper is between about 1 molar and about 5 molar, the ratio of the copper in the cupric form to the copper in the cuprous form is between about 2:1 and about 5:1 and the reaction is carried out at a temperature between about 145° C. and about 160° C. under pressure sufficient to at least maintain the aqueous solution in the liquid phase; withdrawing a gaseous effluent comprising reaction products and unconverted feed material from the reaction zone; scrubbing said gaseous effluent with water to sorb isopropyl alcohol in the water; returning the resulting gaseous material from said scrubbing step to the reaction zone; distilling the aqueous solution containing isopropyl alcohol to separate water as a bottoms fraction from an overhead azeotropic alcohol water mixture; recovering the overhead as the product of the process and returning the aqueous bottoms fraction to the scrubbing zone.

15. The process for the production of an azeotropic mixture of isopropyl alcohol and water comprising: contacting in a reaction zone propylene with an aqueous solution containing a copper halide mixture of cupric halide and cuprous halide selected from the group consisting of a chloride and a bromide, and a solubilizing halide selected from the group consisting of chlorides and bromides of lithium, sodium, potassium, rubidium, cesium, beryllium, magnesium, calcium, strontium, barium, ammonium and mixtures thereof wherein the concentration of total copper is between about .5 molar and about 5 molar and the ratio of copper in the cupric form to the copper in the cuprous form is between about 0.2:1 and about 10.1 and the equivalent ratio of the solubilizing halide to the cuprous halide is between about 0.5:1 and about 2:1 and the reaction is carried out at a temperature between about 150° C. and about 190° C. under pressure sufficient to at least maintain the aqueous solution in the liquid phase; withdrawing a gaseous effluent comprising reaction products and unconverted feed material from the reaction zone; scrubbing said gaseous effluent with water to sorb isopropyl alcohol in the water; returning the resulting gaseous material from said scrubbing step to the reaction zone; distilling the aqueous solution containing isopropyl alcohol to separate water as a bottoms fraction from an overhead azeotropic alcohol water mixture; recovering the overhead as the product of the process and returning the aqueous bottoms fraction to the scrubbing zone.

16. The process for the production of an azeotropic mixture of isopropyl alcohol and water comprising: contacting in a reaction zone propylene with an aqueous solution containing cupric chloride and cuprous chloride and a solubilizing chloride selected from the group consisting of lithium, sodium, potassium, rubidium, cesium, beryllium, magnesium, calcium, strontium, barium, ammonium and mixtures thereof wherein the concentration of a total copper is between about 1 molar and about 4 molar and the ratio of copper in the cupric form to the copper in the cuprous form is between about 0.4:1 and about 3:1 and the equivalent ratio of the solubilizing chloride to the cuprous chloride is between about 1:1 and about 2:1 and the reaction is carried out at a temperature between about 155° C. and about 180° C. under a pressure sufficient to at least maintain the aqueous solution in the liquid phase; withdrawing a gaseous effluent comprisng reaction products and unconverted feed material from the reaction zone; scrubbing said gaseous effluent with water to sorb isopropyl alcohol in the water; returning the resulting gaseous material from said scrubbing step to the reaction zone; distilling the aqueous solution containing isopropyl alcohol to separate water as a bottoms fraction from an overhead azeotropic alcohol water mixture; recovering the overhead as the product of the process and returning the aqueous bottoms fraction to the scrubbing zone.

No references cited.

LEON ZITVER, *Primary Examiner.*

J. E. EVANS, *Assistant Examiner.*

UNITED STATES PATENT OFFICE
CERTIFICATE OF CORRECTION

Patent No. 3,328,469                  June 27, 1967

Marshall L. Spector et al.

It is hereby certified that error appears in the above numbered patent requiring correction and that the said Letters Patent should read as corrected below.

Column 4, line 16, "liquedfied" read -- liquefied --; column 5, TABLE II, first column, line 11 thereof, for "1,2-1ichloropropane" read -- 1,2-dichloropropane --; column 6, line 35, for "queous" read -- aqueous --; column 7, line 9, for "patassium" read -- potassium --; column 8, line 40, for "10.1" read -- 10:1 --; line 75, for "comprisng" read -- comprising --.

Signed and sealed this 14th day of January 1969.

(SEAL)
Attest:

Edward M. Fletcher, Jr.                EDWARD J. BRENNER

Attesting Officer                   Commissioner of Patents